US007535686B2

(12) United States Patent
Valdes et al.

(10) Patent No.: US 7,535,686 B2
(45) Date of Patent: May 19, 2009

(54) CONTROL OF CIRCUIT BREAKERS IN A MULTI-PHASE POWER SYSTEM

(75) Inventors: Marcelo Valdes, Burlington, CT (US); Thomas F. Papallo, Farmington, CT (US)

(73) Assignee: General Electric Company, Schenectady, NY (US)

( * ) Notice: Subject to any disclaimer, the term of this patent is extended or adjusted under 35 U.S.C. 154(b) by 20 days.

(21) Appl. No.: 11/147,964

(22) Filed: Jun. 8, 2005

(65) Prior Publication Data

US 2006/0279884 A1 Dec. 14, 2006

(51) Int. Cl.
*H02H 3/033* (2006.01)
*H02H 9/02* (2006.01)
(52) U.S. Cl. .............................. 361/42; 361/64; 361/66
(58) Field of Classification Search .................. 361/42, 361/64, 66
See application file for complete search history.

(56) References Cited

U.S. PATENT DOCUMENTS

| | | | | | |
|---|---|---|---|---|---|
| 2,357,853 | A | * | 9/1944 | Smith, Jr. | 337/110 |
| 2,376,201 | A | * | 5/1945 | Starr | 361/17 |
| 3,214,639 | A | * | 10/1965 | Cabanes et al. | 361/47 |
| 3,288,965 | A | * | 11/1966 | Klein | 337/70 |
| 3,539,866 | A | * | 11/1970 | Stevenson | 361/44 |
| 7,068,483 | B2 | * | 6/2006 | Papallo et al. | 361/72 |
| 7,145,757 | B2 | * | 12/2006 | Shea et al. | 361/2 |
| 2006/0012931 | A1 | * | 1/2006 | Engel et al. | 361/93.1 |

OTHER PUBLICATIONS

The Authoritative Dictionary of IEEE Standard Terms, 7th Edition, 2000, IEEE Press, pp. 422.*
Valdes et al. "Protection, Control, Reliability and Diagnostic Improvements via Single-Processor Control of Circuit Breakers in Low Voltage Switchgear". Presented at an IEEE conference sponsored by IAS call PPIC (pulp and paper industry conference) Jun. 2004.
Valdes et al. "The Single-Processor Concept for Protection and Control of Circuit Breakers in Low-Voltage Switchgear". Presented publicly at an IEEE conference sponsored by the IAS section of the IEEE called PCIC (petroleum & chemical industry conference) Sep. 2003.

* cited by examiner

*Primary Examiner*—Stephen W Jackson
*Assistant Examiner*—Zeev Kitov
(74) *Attorney, Agent, or Firm*—Ohlandt, Greeley, Ruggiero & Perle, L.L.P.

(57) ABSTRACT

There is provided a method of controlling circuit breakers in a multi-phase power system. The method includes (a) recognizing a concurrent presence of a first fault in a first phase of the power system and a second fault in a second phase of the power system, where the power system includes a first circuit breaker situated to conduct a fault current between the first and second phases, (b) controlling a second circuit breaker to open so that the fault current is interrupted, where the second circuit breaker, when closed, provides current to the first circuit breaker, and (c) controlling the first circuit breaker to remain closed until the second circuit breaker is opened.

11 Claims, 4 Drawing Sheets

CONTROL OF CIRCUIT BREAKERS IN A MULTI-PHASE POWER SYSTEM

BACKGROUND OF THE INVENTION

1. Field of the Invention

The present disclosure relates to the control of circuit breakers, and more particularly, to the control of circuit breakers in a multi-phase impedance grounded or un-grounded low voltage power system during concurrent faults.

2. Description of the Related Art

Three-phase power systems are used in many industrial processes. A three-phase power system is one in which currents for three sinusoidal voltages are carried through a power distribution device, and in which the sinusoidal voltages are 120 degrees out of phase with one another. The three-phase power system, similar to a single-phase power, uses circuit breakers to interrupt the flow of current through a power line in the event of a ground fault. A ground fault is a situation where single-phase current that flows through a circuit protective device to the load, returns to a source through a circuit path back to a current source, without flowing through the same device or circuit through which the current is intended to flow in both directions.

In a solidly grounded system single-phase power, such as is found in a typical residential home or most commercial installations, if there is a ground fault in a circuit a circuit breaker trips (i.e., opens), hence there is no power conveyed to the circuit until the breaker is reset (closed). However, in many three-phase applications, where interruption to the power is highly undesirable, an impedance grounded or an ungrounded system may be employed. In such a system a "first ground fault" creates very little fault current. This creates a situation where the ground fault may be allowed to persist and power continues to flow to the load un-interrupted. This may be the case, for example, in a chemical plant where removal of power during a chemical process can have serious, and indeed catastrophic, consequences. Typically, therefore, a limiting resistance, e.g., 100 ohms, is interposed in a ground path to the current source to limit the first ground fault current to a few amperes, typically 5 or less.

However, there is a possibility of a concurrent occurrence of a first fault in a first phase of a three-phase system, and a second fault in a second phase of the three-phase system. This sets up a circuit with phase to phase voltage differential between the two poles involved, this is then the basis for a phase-to-phase fault current flowing, through ground, between the first and second phases. Consequently, the aforementioned grounding resistance is bypassed. The phase-to-phase fault current is much greater than the fault current in the case of a single ground fault. The phase-to-phase fault current can present a serious hazard, and as such, should be interrupted immediately.

However, in the case of concurrent faults, opening a circuit breaker to interrupt the phase-to-phase current may pose a problem. When a current path is suddenly opened, the protective device must clear an arc formed by the current through the gap created by the opening of the device's contacts. This produces significant physical stress on the protective device.

One type of protective device commonly used are circuit breakers. There are two types of circuit breakers commonly used. Low Voltage Power Circuit Breakers UL listed under UL standard 1066, and Molded Case Circuit Breaker UL listed under standard UL 489. These devices differ in operating capabilities. One difference is that molded case circuit breakers are designed to employ two or more poles within the same circuit breaker to interrupt fault current up to the listed capability of the device. The ability of these devices to interrupt maximum potential single phase fault current with a single pole at rated voltage may be extremely limited. The UL 489 standard does not require UL489 circuit breaker to have significant single pole capability. It is not expected that these circuit breakers are to be used in systems that are impedance grounded, where short circuit currents may be large and ground faults may be prevalent. The second kind of circuit breaker is built to UL 1066 and it does have substantial single pole ratings. Specifically, 87% of the short circuit rating determined for the circuit breaker while clearing full 3-phase fault. Low Voltage Power Circuit Breakers are may be larger and significantly more expensive than electrically equivalent circuit breakers built to UL 489 standards.

Therefore, there is a need for a safer technique of controlling circuit breakers in a case of a concurrent fault on two or more phases of an impedance grounded or un-grounded multi-phase power system.

SUMMARY OF THE INVENTION

In a first aspect, a method of controlling circuit breakers in a multi-phase power system includes (a) recognizing a concurrent presence of a first fault in a first phase of the power system and a second fault in a second phase of the power system, where the power system includes a first circuit breaker situated to conduct a fault current between the first and second phases; and (b) controlling a second circuit breaker to open so that the fault current is interrupted, where the second circuit breaker, when closed, provides current to the first circuit breaker.

In another aspect, a method of controlling circuit breakers in a multi-phase power system includes (a) recognizing a first fault in a circuit that receives current via a first circuit breaker, (b) recognizing a second fault in a circuit that receives current via a second circuit breaker, and (c) opening a third circuit breaker, where the third circuit breaker, when closed, provides current to both of the first and second circuit breakers.

A circuit breaker protection system includes (a) a module that recognizes a concurrent presence of a first fault in a first phase of a power system and a second fault in a second phase of the power system, where the power system includes a first circuit breaker situated to conduct a fault current between the first and second phases, and (b) a module that controls a second circuit breaker to open so that the fault current is interrupted, where the second circuit breaker, when closed, provides current to the first circuit breaker.

A storage media includes (a) instructions for controlling a processor to recognize a concurrent presence of a first fault in a first phase of a power system and a second fault in a second phase of the power system, where the power system includes a first circuit breaker situated to conduct a fault current between the first and second phases, and (b) instructions for controlling the processor to control a second circuit breaker to open so that the fault current is interrupted, where the second circuit breaker, when closed, provides current to the first circuit breaker.

DESCRIPTION OF THE INVENTION

Figure 1:
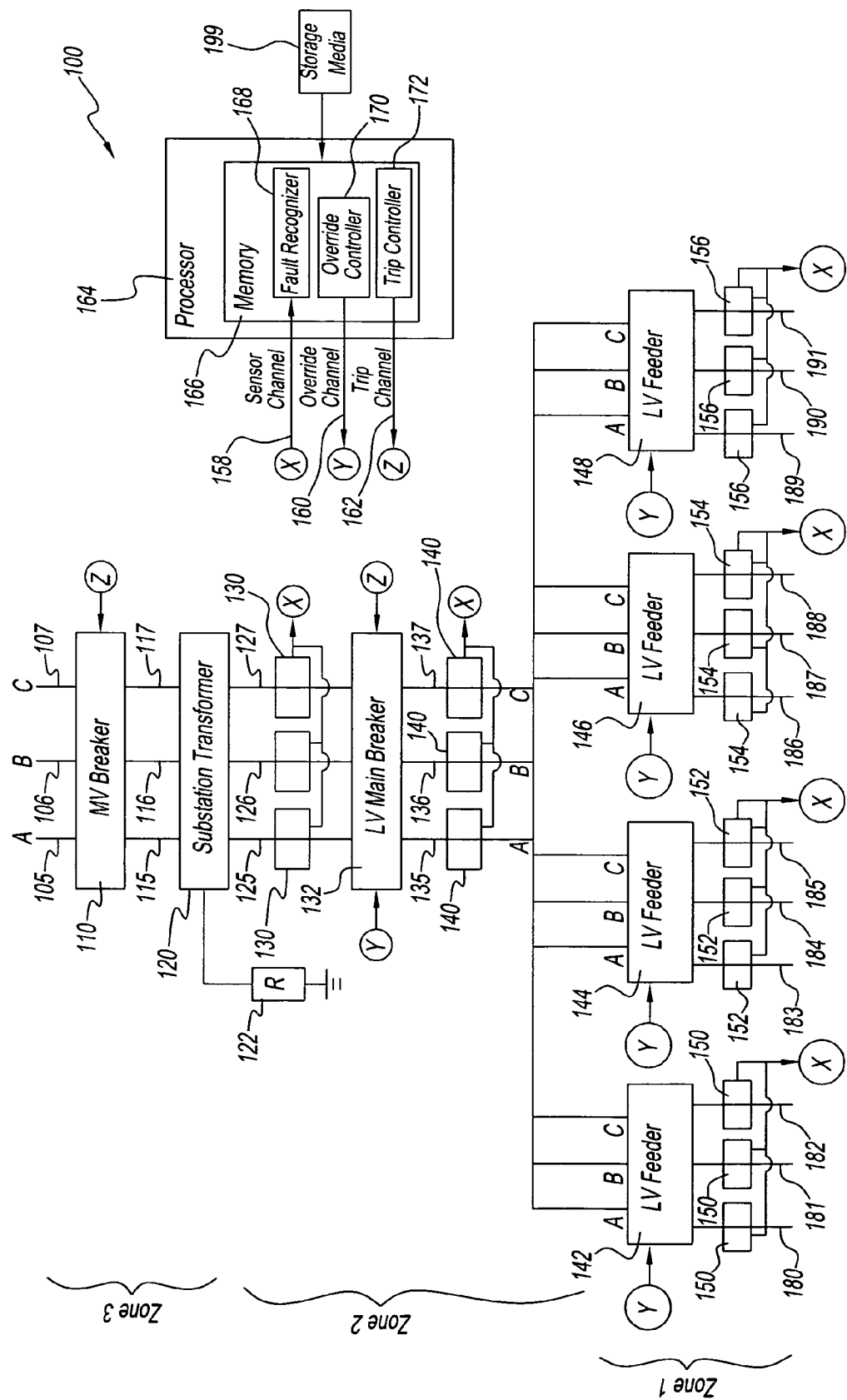
FIG. 1 is a block diagram of a multi-phase power system having circuit breakers organized in a circuit breaker hierarchy.

FIG. 1 is a block diagram of a multi-phase power system 100. System 100 includes a medium voltage (MV) breaker 110, a substation transformer 120, a low voltage (LV) main breaker 132, LV feeders 142, 144, 146 and 148, and current transformers (CT) 130, 140, 150, 152, 154 and 156. System 100 also includes a processor 164. A sensor channel 158, a path of which is represented, in part, by connector bubbles "X", is coupled to CTs 130, 140, 150, 152, 154 and 156, and processor 164. An override channel 160, a path of which is represented, in part, by connector bubbles "Y", is coupled to processor 164, LV main breaker 132, and LV feeders 142, 144, 146 and 148. A trip channel 162, a path of which is represented, in part, by connector bubbles "Z", is coupled to processor 164, MV breaker 110, and LV main breaker 132.

System 100 is organized into a circuit breaker hierarchy having three zones, namely zones 1, 2 and 3. LV feeders 142, 144, 146 and 148 are in zone 1. LV main breaker 132 is in zone 2. MV breaker 110 is in zone 3. A circuit breaker in a higher order zone provides current to a circuit breaker in a lower order zone. MV breaker 110, in zone 3, provides current to LV main breaker 132, in zone 2, which provides current to LV feeders 142, 144, 146 and 148, in zone 1.

System 100 receives three-phase (i.e., phases A, B and C) MV over power lines 105, 106, and 107. Power line 105 carries phase A, power line 106 carries phase B, and power line 107 carries phase C. Each of phases A, B and C is a sinusoidal voltage, 120 degrees out of phase with the other two phases. MV is generally regarded as being in a range of about 5,000 volts to about 35,000 volts, i.e., about 5 kv to about 35 kv.

MV breaker 110 receives the three-phase MV over power lines 105, 113, and 115, and provides three-phase MV outputs via power lines 115, 116 and 117, for phases A, B, and C, respectively. MV breaker 110, is a multi-phase circuit breaker that, when tripped, i.e., opened, interrupts current to all of power lines 115, 116 and 117. MV breaker 110 has an electrical/mechanical trip capability, such that MV breaker 110 will trip automatically in accordance with a time-current setting. It is typical in the industry that MV circuit breakers use an external trip device. In other words the circuit breaker itself is a controllable switch. The trip control is typically located in a separate box. That is, if a current through MV breaker 110 exceeds a predetermined value for a predetermined period of time, then MV breaker 110 will trip automatically. Additionally, in response to a trip command on trip channel 162, MV breaker 110 can be controlled to trip.

Substation transformer 120 receives the three-phase MV via power lines 115, 116, and 117, steps down the MV, and outputs three-phase LV via power lines 125, 126 and 127, for phases A, B, and C, respectively. LV is generally regarded as being in a range of about 208 volts to about 600 volts. A resistance 122 is in series with a ground return to substation transformer 120.

LV main breaker 132 receives three-phase LV via power lines 125, 126 and 127, and outputs three-phase LV via power lines 135, 136 and 137, for phases A, B, and C, respectively. LV main breaker 132 is a multi-phase circuit breaker that,  when tripped, interrupts current to all of power lines 135, 136 and 137. LV main breaker 132 has an electrical/mechanical trip capability, such that LV main breaker 132 will trip automatically in accordance with a time-current setting. That is, if a current through LV main breaker 132 exceeds a predetermined value for a predetermined period of time, then LV main breaker 132 will trip automatically. Additionally, in response to a trip command on trip channel 162, LV main breaker 132 can be controlled to trip. In response to an override command on override channel 160, LV breaker 132 can be controlled to not trip, i.e, to remain closed.

LV feeders 142, 144, 146 and 148 each receive three-phase LV via power lines 135, 136 and 137. LV feeder 142 provides three-phase LV via power lines 180, 181 and 182, for phases A, B, and C, respectively. LV feeder 144 provides three-phase LV via power lines 183, 184 and 185 for phases A, B, and C, respectively. LV feeder 146 provides three-phase LV via power lines 186, 187 and 188 for phases A, B, and C, respectively. LV feeder 148 provides three-phase LV via power lines 189, 190 and 191, for phases A, B, and C, respectively.

LV feeder 142 is a multi-phase circuit breaker that, when tripped, interrupts current to all power lines 180, 181 and 182. LV feeder 142 has an electrical/mechanical trip capability, such that LV feeder 142 will trip automatically in accordance with a time-current setting. That is, if a current through LV feeder 142 exceeds a predetermined value for a predetermined period of time, then LV feeder 142 will trip automatically. Additionally, in response to an override command on override channel 160, LV feeder 142 can be controlled to not trip, i.e, to remain closed. LV feeders 144, 146 and 148 operate similarly to LV feeder 142.

CTs 130, 140, 150, 152, 154 and 156 are situated on downstream sides of substation 120, LV main breaker 132, LV feeder 142, LV feeder 144, LV feeder 146, and LV feeder 148, respectively. CT 130 senses current flowing through power lines 125, 126 and 127, and outputs a signal indicative thereof onto sensor channel 158. More particularly, if a fault current is flowing through any of power lines 125, 126 or 127, CT 130 will output a signal onto sensor channel 158 indicating the existence of the fault current. Although CT 130 is represented in FIG. 1 as being a single device, in practice, it is three individual current transformers/independent devices, one for each of power lines (currents) 125, 126 and 127. CTs 140, 150, 152, 154 and 156 operate similarly to CT 130.

Processor 164 receives an input via sensor channel 158, and provides outputs via trip channel 162 and override channel 160. Processor 164 has an associated memory 166 that contains instructions in the form of a fault recognizer module 168, an override controller module 170, and a trip controller module 172, for controlling processor 164. The term "module" is used herein to denote a functional operation that may be embodied either as a stand-alone component or as an integrated configuration of a plurality of sub-ordinate components. Although fault recognizer module 168, override controller module 170, and trip controller module 172, are described herein as being installed in memory 166, they could reside on an external storage media 199 for subsequent loading into memory 166. Storage media 199 can be any conventional storage media, including, but not limited to, a floppy disk, a compact disk, a magnetic tape, a read only memory, or an optical storage media. Storage media 199 could also be a random access memory, or other type of electronic storage, located on a remote storage system and coupled to memory 199.

Moreover, although fault recognizer module 168, override controller module 170, and trip controller module 172, are described herein as being installed in memory 166, and therefore being implemented in software, they could be implemented in any of hardware, firmware, software, or a combination thereof.

Fault recognizer module 168, based on signals received via sensor channel 158, recognizes an existence of a fault in a power line. For example, CT 130 may send a signal indicative of a fault in power line 125, i.e., phase A. The fault can provide a current path to ground.

Override controller module 170, upon fault recognizer module 168 recognizing a fault, outputs an override command onto override channel 160. Override controller module 170 can selectively direct the override command to any of LV main breaker 132, LV feeder 142, LV feeder 144, LV feeder 146, or LV feeder 148. The recipient of the override command is thus instructed to remain closed.

Trip controller module 172, upon fault recognizer module 168 recognizing a fault, outputs a trip command via trip channel 162. Trip controller module 172 can selectively direct the trip command to either of MV breaker 110 or LV main breaker 132. The recipient of the trip command is thus instructed to open.

Figure 2:
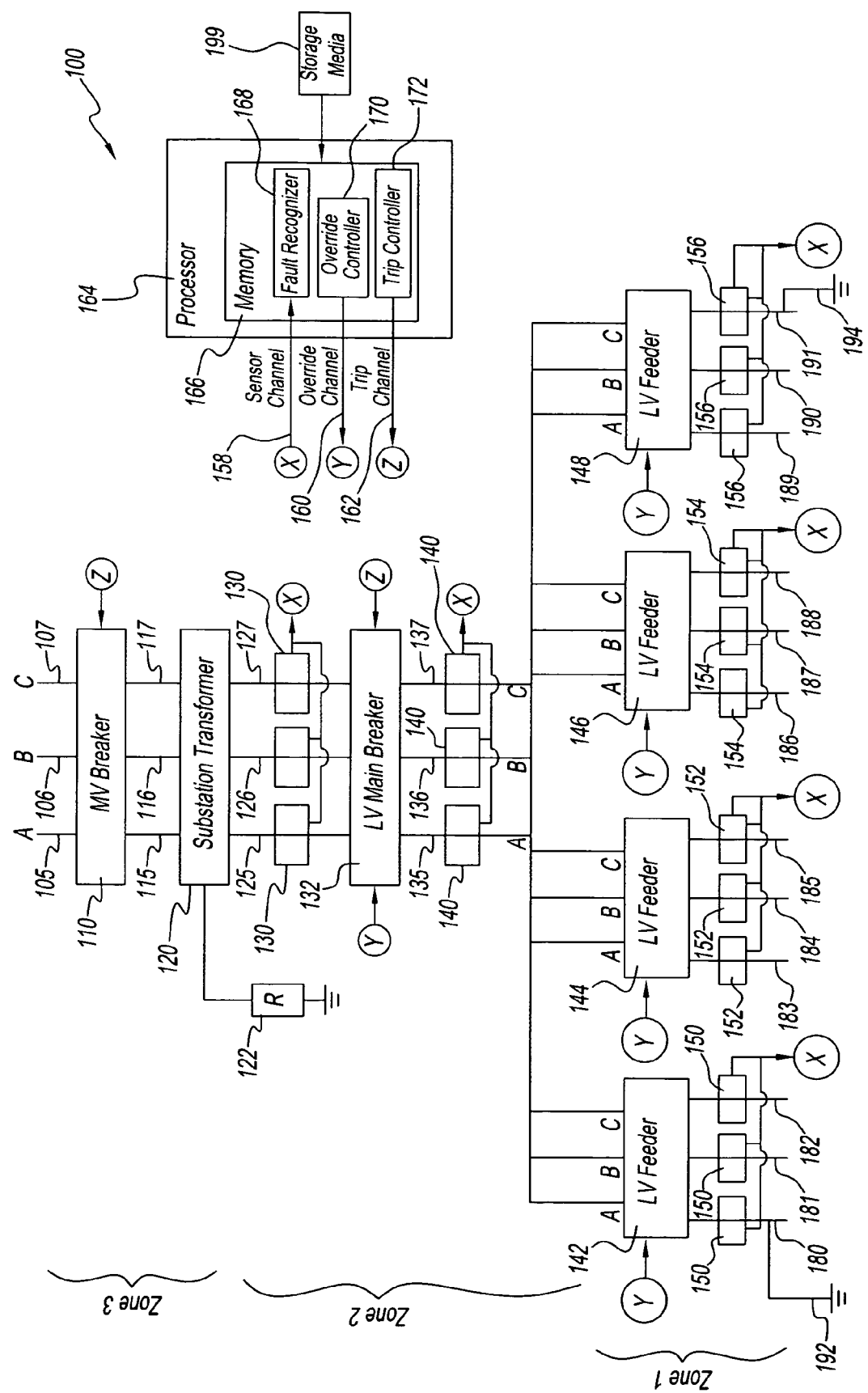
FIG. 2 is a block diagram of the multi-phase power system of FIG. 1, illustrating an exemplary fault between two circuit breakers on the same level of the circuit breaker hierarchy.

FIG. 2 is a block diagram of the multi-phase power system of FIG. 1, and illustrates an example of a fault between two circuit breakers on a same level of the circuit breaker hierarchy. Assume an occurrence of a fault 192 in power line 180, i.e., phase A of LV feeder 142, that provides a current path from power line 180 to ground.

If fault 192 were the only fault in system 100, fault current would flow from power line 180, through fault 192, ground, and resistance 122, to substation transformer 120. Because of the presence of resistance 122, the fault current in this case is limited to an acceptable value, e.g., a few Amps. Furthermore, because the fault current has been limited, LV feeder 142 does not trip, but instead, remains closed.

Now, assume an occurrence of an additional fault, for example, a fault 194 in power line 191, i.e., phase C of LV feeder 148. Fault 194 provides a current path from power line 191 to ground. Whereas fault 192 provides a current path from power line 180 to ground, and whereas fault 194 provides a current path from power line 191 to ground, a path exists for a phase-to-phase fault current to flow, via ground, between power line 180 and power line 191.

The phase-to-phase fault current, if permitted to flow, would normally exceed the time-current settings of LV feeders 142 and 148. Since LV feeders 142 and 148 are independent devices, if they were permitted to trip, they would not trip simultaneously. Consequently, the first of LV feeders 142 and 148 to trip would have a phase-to-phase voltage across its internal breaker contacts until the other of LV feeders 142 and 148 trips. For example, if LV feeder 142 were first to trip, while LV feeder 148 remained closed, internal contacts for phase A of LV feeder 142 would experience the voltage of phase A on one side (via power line 135), and the voltage of phase C on the other side (via the path from power line 191, through fault 194, ground, fault 192 and power line 180). Having the full phase to phase voltage and the full fault current interrupted by a single pole on a single circuit breaker at one moment places increased physical stress on the particular circuit breaker attempting this. This creates a situation that necessitates employment of circuit breakers specifically designed to handle this severe duty.

System 100 avoids such a hazard. CT 150 outputs a signal onto sensor channel 158 indicating a fault in power line 180. Likewise, CT 156 outputs a signal onto sensor channel 158 indicating a fault in power line 191. Processor 164, and in particular fault recognizer module 168, recognizes the concurrent presence of the faults. Override controller module 170 then issues, via override channel 160, an override command to each of LV feeders 142 and 148, thus commanding LV feeders 142 and 148 to remain closed.

Also, trip controller module 172 issues, via trip channel 162, a trip command that controls LV main breaker 132 to open. As an alternative to opening LV main breaker 132, trip controller module 172 could issue the trip command to control MV breaker 110 to open. In either case, that is, opening of either MV breaker 110 or LV main breaker 132, current to both of LV feeders 142 and 148 is interrupted. This is because MV breaker 110 is in zone 3, LV main breaker 132 is in zone 2, and LV feeders 142 and 148, as well as faults 192 and 194, are in zone 1.

Thus, processor 164 recognizes a concurrent presence of fault 192, which is in phase A of system 100, and fault 194, which is in phase C of system 100. LV feeder 142 is situated to conduct a fault current between phase A and phase C. LV main breaker 132, when closed, provides current to LV feeder 142. Accordingly, processor 164 controls LV main breaker 132 to open so that the fault current is interrupted. The technical effect of this technique is that controlling the operation of LV main breaker 132 and LV feeder 142 reduces an opportunity for a catastrophic failure of LV feeder 142 or the need to employ the more expensive circuit breaker normally required for this duty.

In the particular example represented in FIG. 2, fault 192 is in a circuit, i.e., power line 180, that receives current via LV feeder 142, and fault 194 is in a circuit, i.e., power line 191, that receives current via LV feeder 148. LV main breaker 132, when closed, also provides current to LV feeder 148. Accordingly, processor 164 controls LV feeder 142 and LV feeder 148 to remain closed until LV main breaker 132 is opened.

Figure 3:
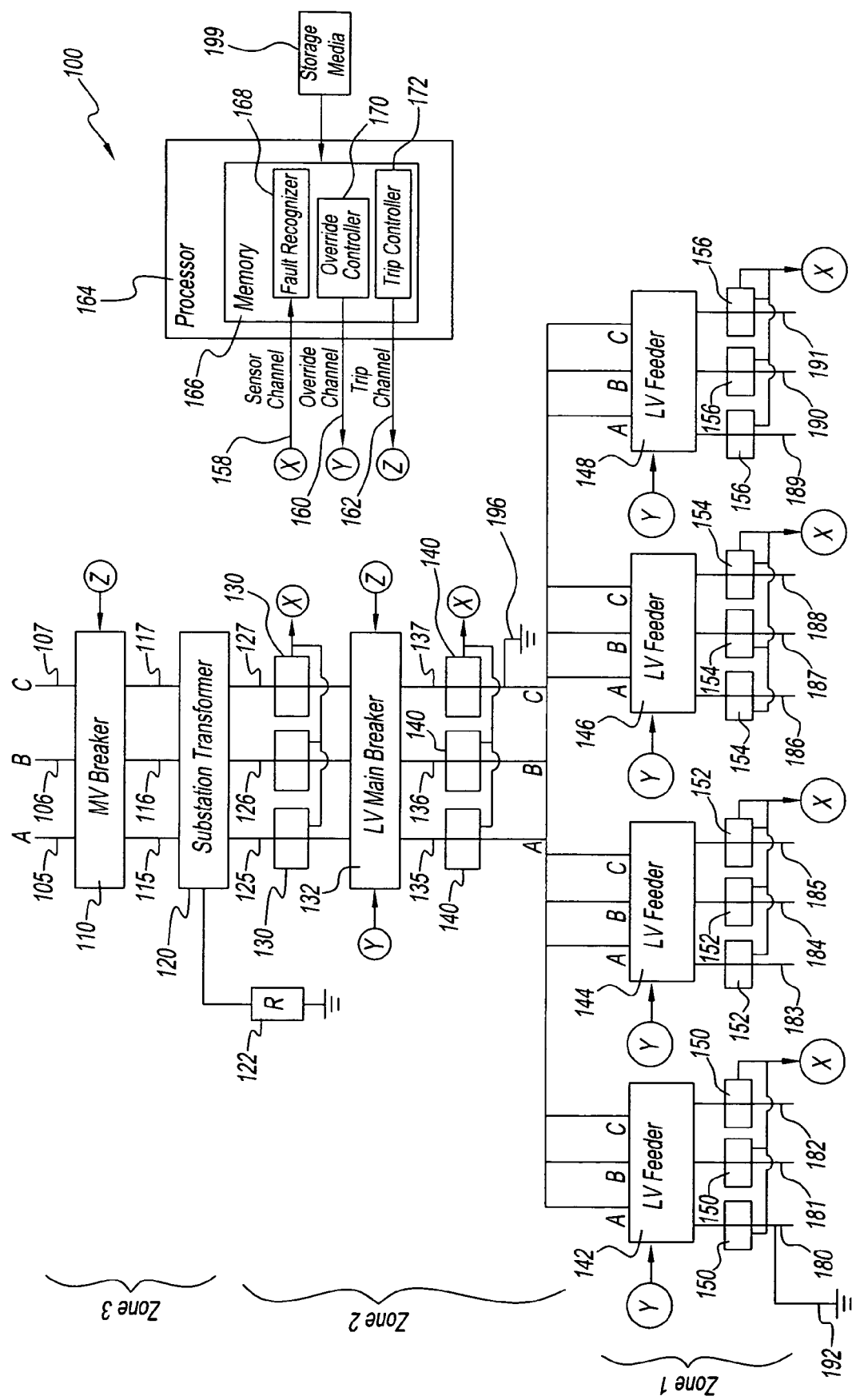
FIG. 3 is a block diagram of the multi-phase power system of FIG. 1, illustrating an exemplary a fault between two circuit breakers on different levels of the circuit breaker hierarchy.

FIG. 3 is a block diagram of the multi-phase power system of FIG. 1, and illustrates an example of a fault between two circuit breakers on different levels of the circuit breaker hierarchy. Assume an occurrence of fault 192, as described above, and also a fault 196 in power line 137, i.e, phase C of LV main breaker 132. Fault 192 is in zone 1, and fault 196 is in zone 2. A path exists for a phase-to-phase fault current to flow, via ground, between power line 180 and power line 137. LV feeder 142 is situated to conduct the phase-to-phase fault current, but if LV feeder 142 were to open, it would experience a phase-to-phase voltage across its contacts, e.g., phase A on power line 135 and phase C on power line 180 (in a path provided via fault 196, ground, and fault 192).

CT 150 provides, via sensor channel 158, an indication of a fault in power line 180, and CT 140 provides, via sensor channel 158, an indication of a fault in power line 137. Fault recognizer module 168 recognizes the concurrent faults. Override controller module 170 issues an override command, via override channel 160, to control LV feeder 142 to remain closed. Trip controller module 172 issues a trip command, via trip channel 162, for LV main breaker 132 to open. LV main breaker 132 is in zone 2, and LV feeder 142 and fault 192, are in zone 1, therefore, opening LV main breaker 132 interrupts current to LV feeder 142, and so, the phase-to-phase fault current is interrupted. Opening LV main breaker 132 also interrupts current flow through fault 196.

Figure 4:
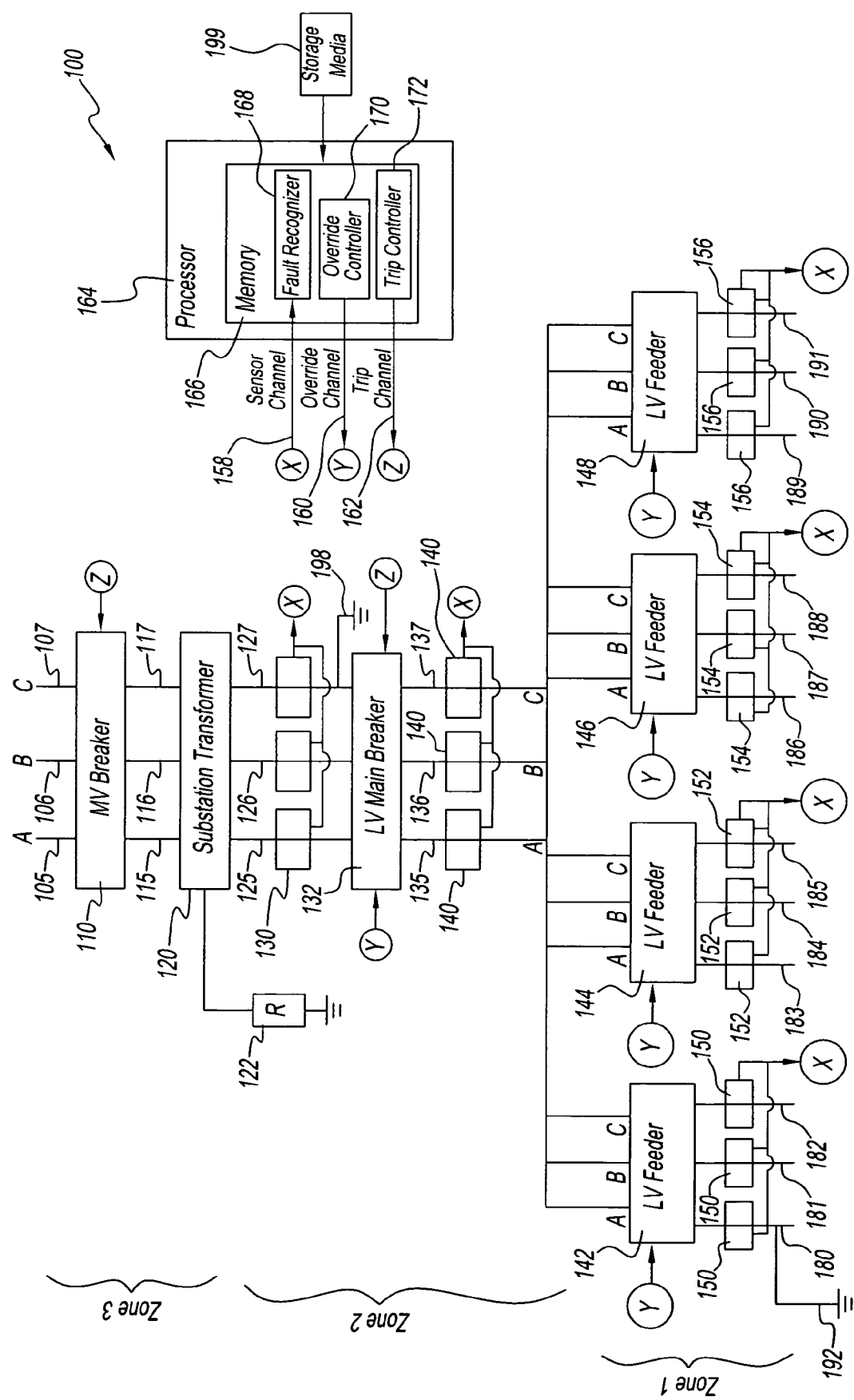
FIG. 4 is a block diagram of the multi-phase power system of FIG. 1, illustrating an exemplary fault between two circuit breakers on different levels of the circuit breaker hierarchy.

FIG. 4 illustrates another fault scenario between two circuit breakers on different levels of the circuit breaker hierarchy. Assume an occurrence of fault 192, as described above, and also a fault 198 in power line 127, i.e., phase C of stationary transformer 120. Fault 192 is in zone 1, and fault 198 is in zone 2. A path exists for a phase-to-phase fault current to flow, via ground, between power line 180 and power line 127. LV feeder 142 is situated to conduct the phase-to-phase fault current, but if LV feeder 142 were to open, it would experience a phase-to-phase voltage across its contacts, e.g., phase A on power line 135 and phase C on power line 180 (in a path provided via fault 198, ground, and fault 192).

CT 150 provides, via sensor channel 158, an indication of a fault in power line 180, and CT 130 provides, via sensor channel 158, an indication of a fault in power line 127. Fault recognizer module 168 recognizes the concurrent faults. Override controller module 170 issues an override command, via override channel 160, to control LV feeder 142 to remain closed. Trip controller module 172 issues a trip command, via trip channel 162, for MV breaker 110 to open. Since MV breaker 110 is in zone 3, and LV feeder 142 is in zone 1, opening MV breaker 110 interrupts current to LV feeder 142, and so, the phase-to-phase fault current is interrupted.

The techniques described herein are exemplary, and should not be construed as implying any particular limitation on the present invention. It should be understood that various alternatives, combinations and modifications could be devised by those skilled in the art. The present invention is intended to embrace all such alternatives, modifications and variances that fall within the scope of the appended claims.

What is claimed is:

1. A method comprising:
recognizing a concurrent presence of a first fault in a first phase of a power system and a second fault in a second phase of said power system, wherein said power system includes a first circuit breaker situated to conduct a fault current between said first and second phases;
controlling a second circuit breaker to open, wherein said second circuit breaker is a multi-phase breaker situated upstream of said first circuit breaker, and that (i) when closed, provides current to said first phase and a current to said second phase, and (ii) when opened, interrupts said current to said first phase and said current to said second phase so that said fault current is interrupted; and
controlling said first circuit breaker to remain closed until said second circuit breaker is opened.

2. The method of claim 1,
wherein said first fault is in a circuit that receives current via said first circuit breaker,
wherein said power system includes a third circuit breaker, and said second fault is in a circuit that receives current via said third circuit breaker,
wherein said second circuit breaker, when closed, also provides current to said third circuit breaker, and
wherein said method further comprises controlling said third circuit breaker to remain closed until said second circuit breaker is opened.

3. The method of claim 1,
wherein said first fault provides a first current path to ground, and said second fault provides a second current path to ground, and
wherein said fault current flows through said first current path and said second current path.

4. A method, comprising:
recognizing a first fault in a circuit that receives current via a first circuit breaker;
recognizing a second fault in a circuit that receives current via a second circuit breaker;
opening a third circuit breaker, wherein said third circuit breaker is a multi-phase breaker situated upstream of said first and second circuit breakers, and that (i) when closed, provides current to said first breaker and current to said second circuit breaker, and (ii) when opened, interrupts said current to said first breaker and said current to said second breaker; and
controlling said first and second circuit breakers to remain closed until said third circuit breaker is opened.

5. The method of claim 4,
wherein said first fault provides a first current path to ground, and said second fault provides a second current path to ground, and
wherein a fault current flows through said first current path and said second current path.

6. A circuit breaker protection system, comprising:
a module that recognizes a concurrent presence of a first fault in a first phase of a power system and a second fault in a second phase of said power system, wherein said power system includes a first circuit breaker situated to conduct a fault current between said first and second phases;
a module that controls a second circuit breaker to open, wherein said second circuit breaker is a multi-phase breaker situated upstream of said first circuit breaker, and that (i) when closed, provides current to said first phase and current to said second phase, and (ii) when opened, interrupts said current to said first phase and said current to said second phase so that said fault current is interrupted; and
module that controls said first circuit breaker to remain closed until said second circuit breaker is opened.

7. The circuit breaker protection system of claim 6,
wherein said power system includes a third circuit breaker,
wherein said first fault is in a circuit that receives current via said first circuit breaker,
wherein said second fault is in a circuit that receives current via said third circuit breaker, and
wherein said second circuit breaker, when closed, also provides current to said third circuit breaker.

8. The circuit breaker protection system of claim 6,
wherein said first fault provides a first current path to ground, and said second fault provides a second current path to ground, and
wherein said fault current flows through said first current path and said second current path.

9. A storage media comprising:
instructions for controlling a processor to recognize a concurrent presence of a first fault in a first phase of a power system and a second fault in a second phase of said power system, wherein said power system includes a first circuit breaker situated to conduct a fault current between said first and second phases;
instructions for controlling said processor to control a second circuit breaker to open, wherein said second circuit breaker is a multi-phase breaker situated upstream of said first circuit breaker, and that (i) when closed, provides current to said first phase and a current to said second phase, and (ii) when opened, interrupts said current to said first phase and said current to said second phase so that said fault current is interrupted; and
instructions for controlling said processor to control said first circuit breaker to remain closed until said second circuit breaker is opened.

10. The storage media of claim 9,
wherein said first fault is in a circuit that receives current via said first circuit breaker,
wherein said power system includes a third circuit breaker, and said second fault is in a circuit that receives current via said third circuit breaker,
wherein said second circuit breaker, when closed, also provides current to said third circuit breaker, and
wherein said storage media further comprises instructions for controlling said processor to control said third circuit breaker to remain closed until said second circuit breaker is opened.

11. The storage media of claim 9,
wherein said first fault provides a first current path to ground, and said second fault provides a second current path to ground, and
wherein said fault current flows through said first current path and said second current path.

* * * * *